March 18, 1969     P. GRIMALDI     3,433,070
FLOWMETER APPARATUS FOR MEASURING FLOW RATE AND DIRECTION
Original Filed Nov. 12, 1964     Sheet 1 of 2
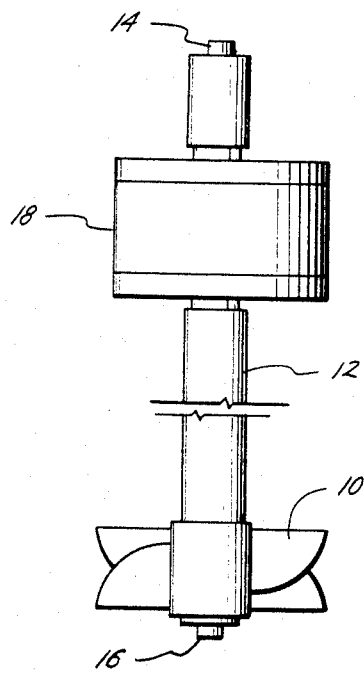
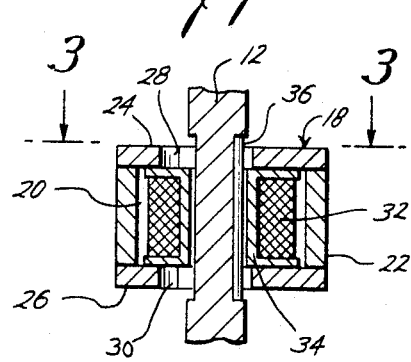
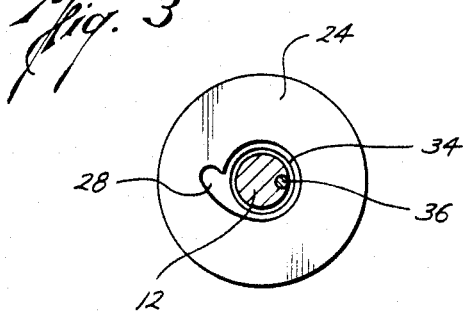
Pierre Grimaldi
INVENTOR.
BY John E. Holder
ATTORNEY Pierre Grimaldi
INVENTOR.

BY John E. Holder

ATTORNEY

United States Patent Office 3,433,070
Patented Mar. 18, 1969

3,433,070
FLOWMETER APPARATUS FOR MEASURING FLOW RATE AND DIRECTION
Pierre Grimaldi, St-Maur, France, assignor to Societe de Prospection Electrique Schlumberger S.A., Paris, France, a corporation of France
Continuation of application Ser. No. 410,498, Nov. 12, 1964. This application May 15, 1967, Ser. No. 638,917
Claims priority, application France, Nov. 15, 1963, 953,994
U.S. Cl. 73—229        11 Claims
Int. Cl. G01f 1/00

ABSTRACT OF THE DISCLOSURE

The particular embodiment disclosed herein as illustrative of one form of the invention in flowmeter apparatus comprises a rotatable shaft having an impeller, a coil mounted proximate said shaft, a core for said coil including a stationary portion and a movable portion eccentrically disposed on said shaft, said stationary portion of said core substantially encircling said shaft and being nonuniform about said shaft for varying the self-inductance of said coil, circuit means including said coil, and means for generating a carrier wave in said circuit means, said variations in self-inductance providing amplitude modulations of said carrier wave in response to such changes in self-inductance.

---

This application is a continuation of application Ser. No. 410,498, filed Nov. 12, 1964, now abandoned.

The invention relates to flowmeters and, more particularly, to flowmeters for measuring the rate and direction of fluid flow.

Two of the main limitations of impeller type flowmeters for measuring the flow of liquid at a very low speed are mechanical friction and the quality of the electrical signals produced by rotation of the impeller.

The use of bearings adapted to resist major lateral and axial accelerations has provided a substantial improvement in the sensitivity of such equipment.

However, the limitations in performance due to the low amplitude of the electrical signals produced by the rotation of the impeller inserted in a slowly flowing liquid, have not hitherto been solved.

It has been proposed, for the measurement of fluid flow at high and low flow rates, to measure the frequency of the voltage produced in a coil upon the movement within the coil of one or more small magnets mounted on the flowmeter shaft or impeller. Since the amplitude of the voltage produced is also proportional to the speed of rotation of the propeller, the signals obtained at very low speeds (one revolution every ten seconds for example) are difficult to amplify suitably. An attempt has been made to remedy this problem of low signal amplitude by setting the magnets on the propeller shaft as near as possible to the detecting coil. Although some measure of success has been obtained in certain cases, the problem of low signal amplitude still exists when measuring very low flow rates.

An object of the present invention is to provide an impeller type flowmeter which produces an electrical signal indicative of flow rate wherein the amplitude of the signal is independent of the speed of rotation of the impeller.

A further object of the invention is to provide an impeller type flowmeter which produces an electrical signal indicative of flow rate wherein the amplitude of the signal is independent of the speed of rotation of the impeller and which signal further produces an indication of the direction of fluid flow through the flowmeter.

With these and other objects in view, the apparatus in accordance with the present invention includes an impeller type flowmeter, the impeller of which is adapted to be rotated by fluid flow about the impeller. More particularly, the flowmeter includes a rod of magnetically permeable material secured to a shaft carrying the impeller. A coil is arranged about the shaft, the coil forming part of a parallel oscillating circuit. A core of magnetically permeable material is provided for the coil, which core includes a stationary portion and a movable portion defined by the rod on the shaft. The stationary portion of the core is nonuniform about the shaft to provide the core with a varying air gap. The rotation of the impeller and rod produce a cyclic modification in the air gap and therefore in the reluctance of the core thereby affecting the inductance of the coil and reactance of the oscillating circuit. The frequency of the oscillating circuit is selected to provide a maximum amount of modulation of the amplitude of the current flowing through the oscillating circuit in response to small variations in the reluctance of the core. Furthermore the nonuniform stationary portion of the core is dissymmetric which affects adidtional variations in reluctance so that an indication is provided as to the direction of rotation of the impeller. The signal generated by the oscillating circuit to fed to an electronic system which provides separate D.C. signals representative of the rate and direction of fluid flow.

A complete understanding of this invention may be had by reference to the following detailed description when read in conjunction with the accompanying drawings illustrating an embodiment thereof, wherein:

FIG. 1 is a schematic view of the impeller and apparatus embodying the present invention for detecting its speed and direction of rotation;

FIG. 2 is a transverse cross-section of the detecting coil;

FIG. 3 is a plan view of the detecting coil;

Figure 4:
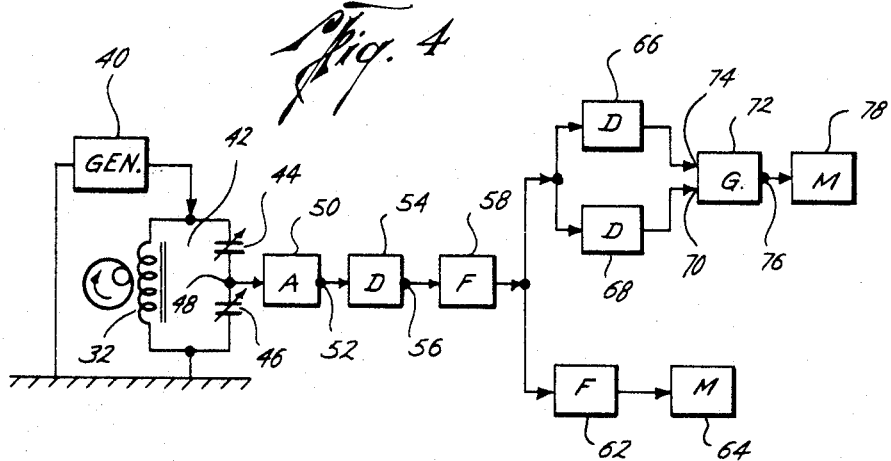
FIG. 4 is a schematic wiring diagram of the electronic system for measuring the speed of rotation of the impeller and determining its direction of rotation.

In FIG. 1, 10 designates an impeller secured by any known means to a shaft 12 provided with rotary pivots 14 and 16. The shaft 12 passes through a detecting assembly 18. A more complete description of an impeller type flowmeter for use in a well bore is set forth in United States Patent No. 3,162,042, issued Dec. 22, 1964 to H. J. Hart.

Referring next to FIG. 2, the detecting system 18 includes a magnetic body 20 constituted by a cylinder 22 made of ferrite and including two identical transverse flanges 24 and 26 which are also made of ferrite and positioned on the upper and lower ends respectively of the cylinder. Open sections 28 and 30 are formed in the flanges 24 and 26. These open sections which show a considerable dissymmetry are each formed by a curvilinear line forming a spiral convolution and another curvilinear line interconnecting the ends of the spiral convolution so as to form a cusp at the start (FIG. 3). A coil 32, fitted on a magnetic frame 34, is inserted inside the body 20. The different parts forming the assembly 18 are secured together by glue, the open or cutout sections 28 and 30 being aligned longitudinally. The magnetic portions of the assembly form a stationary core for the coil 32, with the open sections providing variations in the air gap of the core. The shaft 12 which passes through the assembly has a small rod of ferrite 36 secured to its periphery and positioned longitudinally therealong. This rod forms a movable portion of the core for coil 32 and is arranged to provide cyclic modifications in the reluctance of the core upon rotation of the shaft. It should be pointed out here that the structure of the shaft can be modified in any manner, such as by notching a magnetic shaft which would also produce cyclic modifications in the reluctance of the core.

In FIG. 4 a generator 40 is shown for supplying a substantially constant current, at a frequency of about ten kilocycles, to feed a parallel oscillating circuit 42 formed by the coil 32 and two condensers 44 and 46 inserted in parallel with the coil. The value of the condenser 46 is large with respect to that of the condenser 44. The connecting point 48 between the two condensers 44 and 46 is connected with the input of an amplifier 50. The output 52 of amplifier 50 is connected with the input of a detector 54. The output 56 of the detector 54 feeds the input of a low-pass filter 58. The output 60 of filter 58 is connected with the input of a monostable multivibrator 62 followed by a galvanometric or D.C. type measuring instrument 64.

The output 60 of the filter 58 is also connected with the input of a threshold circuit 66 for detecting characteristics of the signal through the circuit. The output 60 is also fed to the input of another threshold circuit 68 for detecting other characteristics in the signal. The output of the circuit 68 is connected with an input circuit 70 controlling the opening of an electronic gate 72, e.g., a bistable multivibrator. On the other hand, the output of the detector 66 is connected with an input circuit 74 controlling the closing of the gate 72. The output 76 of the gate 72 is connected with the input of a galvanometric type measuring apparatus 78.

Referring now to the oscillating circuit 42, the circuit is supplied with a current by generator 40, the amplitude and frequency of which are substantially unvarying.

The values of the capacities of the condensers 44 and 46 are selected so that the frequency of the current supplied by the generator 40 may lie in either of the two sections of greatest slope of the curve of resonance of the oscillating circuit 42 which sections are slightly above or below the resonant frequency of the circuit. Through this arrangement, the cyclic variation of the reluctance of the coil core, which produces only a small relative modification in the inductance of the coil, corresponds to a large rate of modulation of the amplitude of the alternating current flowing through the oscillating circuit.

When the impeller 10 is positioned within a moving fluid, the impeller revolves at a speed proportional to the throughput of the fluid. The small ferrite rod 36 on the propeller 10 produces a cyclic modification in the gap of the core of coil 32 as it rotates in proximity to the nonuniform cut out portions of the flanges 24 and 26. Furthermore, since the cut out sections 28 and 30 of the coil housing flanges are highly dissymmetric, the cyclic variation of the reluctance shows no symmetry during its cycle and thus differs according to whether the rotation of the shaft is in one direction or the other. By reason of the shape selected for the cutout sections 28 and 30, the inductance of the coil 32 varies in accordance with a dissymmetrical sawtooth outline. Since the coil 32 forms part of the oscillating circuit 42, any small modifications of the inductance of the coil is translated, for the current flowing in the oscillating circuit 42, into much larger modifications in the amplitude of the current in the oscillating circuit 42.

Figure 5:
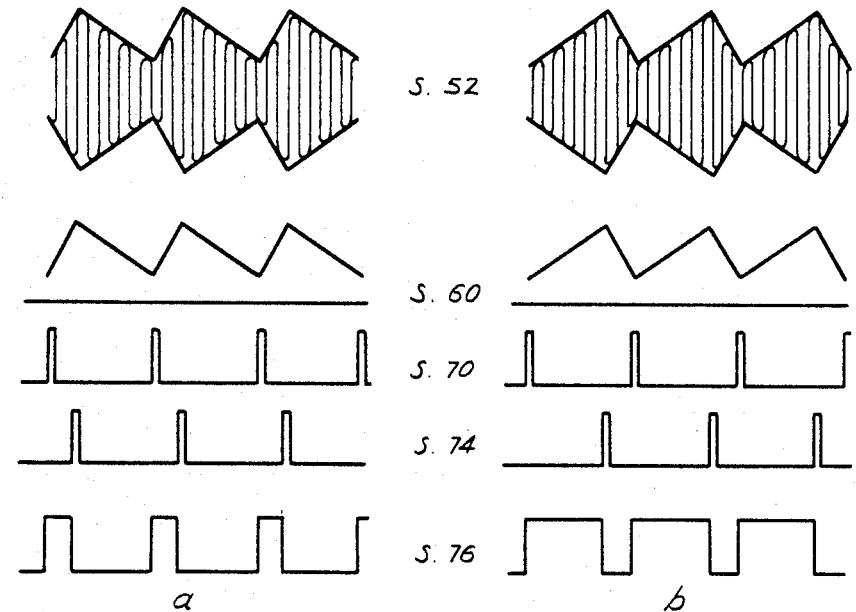
FIG. 5 shows a comparison of signals tapped off at different points of the circuits of FIG. 4, according to the direction of rotation of the impeller.

The amplitude modulated voltage developed across the terminals of the condenser 46 is amplified at 50. The signal appearing at the output 52 is graphically illustrated in FIG. 5 at 52. This signal has a constant frequency which is amplitude modulated by a dissymmetrical sawtooth, the frequency of which is proportional to the speed of rotation of the propeller 10 and the shape of which indicates the direction of rotation of the propeller. Furthermore, the output signal at 52 is detected at 54 to provide an envelope which is smoothed by the filter at 58 to produce the signal shown at 60 in FIG. 5. This signal is then fed to the monostable multivibrator 62 which converts the signal to a square wave shape representing an average current which is imposed upon the galvanometric measuring instrument 64 and is directly proportional to the speed of rotation of the propeller.

The signal at 60 is also connected to the threshold stages 66 and 68. Threshold stage 66 detects the peaks of the sawtooth wave coming from the point 60 while threshold stage 68 detects the troughs of the signal from 60. The outputs of these threshold stages are pulses similar to those illustrated in FIG. 5 at 70 and 74. By controlling the opening or closing of the gate or bistable multivibrator 72 with these pulses, the output 76 of the gate 72 varies in accordance with the direction of rotation of the impeller, with the signal at 76 having an identical amplitude, but a relative duration which is clearly different depending upon the direction of rotation of the shaft 12. The integration of the signals at 76 in the galvanometric measuring instrument 78 provides an average current having two clearly different amplitudes depending upon the direction of rotation. The amplitude of these different average currents is not affected by the speed of rotation of the impeller but rather only by the direction of rotation. The recording at 78 of whichever amplitude is produced permits one to ascertain immediately the direction of flow of the fluid through the flowmeter.

While a particular embodiment of the present invention has been shown and described, it is apparent that changes and modifications may be made without departing from this invention in its broader aspects and, therefore, the aim in the appended claims is to cover all such changes and modifications as fall within the true spirit and scope of this invention.

What is claimed is:

1. A flowmeter comprising a rotatable shaft, an impeller on said shaft, a coil mounted in proximity to said shaft, a core of magnetically permeable material for said coil including a stationary portion and a movable portion eccentrically disposed on said shaft, said stationary portion of said core being nonuniform about said shaft for varying the self-inductance of said coil, resonant circuit means including said coil, and means for generating a carrier wave in said circuit means, said variations in self-inductance providing amplitude modulations of said carrier wave in proportion to such changes in self-inductance.

2. A flowmeter comprising a rotatable shaft; an impeller on said shaft; a coil arranged about said shaft, said coil forming a part of an oscillating circuit; a core of magnetically permeable material for said coil including a stationary portion also arranged about said shaft and a movable portion eccentrically disposed on said shaft, said stationary portion of said core being nonuniform about said shaft for providing said core with a varying air gap; and means for operating said circuit at a frequency which will produce maximum modulations of the amplitude of the output of said circuit in response to minimal movement of said movable portion of said core relative to said stationary portion.

3. In a flowmeter having an impeller which is rotated by the flow of fluid through the flowmeter to produce an electrical signal: a housing for accepting said fluid flow, a member mounted for rotation within the housing, an impeller on said member for converting fluid flow motion into rotary motion of said member, a first and second zone on said member, said first zone having a substantially higher magnetic permeability than that of said second zone so that each zone has a distinct magnetic permeability, coil means arranged about said member, and a core of magnetically permeable material for said coil means including a cylindrical stationary portion also arranged about said member and a movable portion defined by said first zone on said member, said cylindrical stationary portion of said core being dissymmetric about said member for providing said core with a varying air gap.

4. A flowmeter comprising a rotatable shaft, an impeller on said shaft, a coil arranged about said shaft, a core of magnetically permeable material for said coil including a stationary portion also arranged about said shaft and a movable portion eccentrically disposed on said shaft, said stationary portion of said core having a nonuniform cutout portion therein which is formed by one curvilinear line forming a spiral convolution about said shaft and another curvilinear line interconnecting the ends of said spiral convolution so as to form a cusp at the start, and means for detecting variations in reluctance in said core upon movement of said movable portion of said core relative to said stationary portion.

5. A flowmeter comprising a rotatable shaft; an impeller on said shaft; a coil arranged about said shaft, said coil forming a part of an oscillating circuit; a core of magnetically permeable material for said coil including a stationary portion also arranged about said shaft and a movable portion eccentrically disposed on said shaft, said stationary portion of said core being nonuniform about said shaft for providing said core with a varying air gap; means for operating said circuit at a frequency which will produce optimum modulations of the amplitude of the output of said circuit in response to small changes in the reactance of said circuit resulting from the movement of said movable portions of said core relative to said stationary portion, said frequency of operation being selected from a point on the resonance curve of said resonant circuit which point is within sections of maximum slope on the resonance curve, and electrical means connected to said circuit for receiving the output of said circuit and translating said output into direct currents having an average level indicative of the rate and direction of rotation of said flowmeter shaft.

6. A flowmeter comprising a rotatable shaft, an impeller on said shaft, a coil mounted in proximity to said shaft, a core of magnetically permeable material for said coil including a stationary portion and a movable portion disposed on said shaft, said coil forming a part of a resonant circuit, means for providing said resonant circuit with a carrier signal, said coil in said resonant circuit providing means for changing the resonant frequency of said circuit in response to relative movement between said stationary and movable portions of said coil to modulate the amplitude of said carrier signal, said coil and core including means for shaping the wave form of said amplitude modulated signal to provide a characteristic to said signal which is determinative of the direction of rotation of said rotatable shaft, and means for detecting such characteristic of said signal.

7. The apparatus of claim 6 wherein said detecting means includes circuit means for detecting the peaks and troughs of said amplitude modulated signal.

8. The apparatus of claim 7 wherein said detecting means further includes means for providing pulses in response to such detected peaks and troughs, and gating means responsive to such pulses for providing a signal determinative of the direction of rotation of said shaft.

9. In a flowmeter having an impeller which is rotated by the flow of fluid through the flowmeter to produce an electrical signal, a housing for accepting said fluid flow, a shaft mounted for rotation with the housing, an impeller on said shaft for converting fluid flow motion into rotary motion of said shaft, a resonant circuit having at least one reactive element therein, and means for imparting a carrier wave to said resonant circuit, said shaft having a nonuniform irregularity in its characteristic which moves in effective proximity to said reactive element of said resonant circuit to cyclically alter the resonant frequency of said circuit in a distinctive characteristic manner which is determinative of the direction of rotation of said shaft.

10. In a flowmeter having an impeller which is rotated by the flow of fluid through the flowmeter to produce an electrical signal, a housing for accepting said fluid flow, a shaft mounted for rotation within the housing, an impeller on said shaft for converting fluid flow motion into rotary motion of said shaft, a circuit including means for imparting a carrier wave to said circuit, said shaft and circuit including means for modulating said carrier wave in a manner characteristic of the rate and direction of rotation of said shaft, said modulating means including a coil and core with said core having a dissymmetrical configuration for shaping the wave form of the modulated carrier wave in a distinctive manner which is characteristic of the direction of rotation of said shaft.

11. The apparatus of claim 10 wherein said carrier wave is amplitude modulated and said detecting means includes means connected to said circuit for receiving the output of said circuit, circuit means for detecting the peaks and troughs of said amplitude modulated signal and means responsive to said peak and trough detecting means for providing a visual indication of the rate and direction of rotation of said shaft.

References Cited

UNITED STATES PATENTS

| | | | |
|---|---|---|---|
| 2,728,893 | 12/1955 | Bartelink | 73—231 X |
| 2,790,145 | 4/1957 | Bartelink. | |
| 2,962,895 | 12/1960 | Rumble | 73—155 |
| 3,002,384 | 10/1961 | MacDonald et al. | 73—231 |
| 3,053,087 | 9/1962 | Waugh | 73—231 |
| 3,162,042 | 12/1964 | Hart | 73—155 |
| 3,177,711 | 4/1965 | Ham et al. | 73—231 |
| 3,247,456 | 4/1966 | Dokter et al. | |
| 2,993,382 | 7/1961 | Orrange | 73—503 X |
| 1,804,168 | 5/1931 | Keller | 340—192 X |
| 2,270,141 | 1/1942 | Potter | 73—231 X |
| 2,901,716 | 8/1959 | Brown et al. | 340—195 X |
| 3,002,384 | 10/1961 | MacDonald et al. | 73—231 |
| 3,162,042 | 6/1960 | Hart | 73—155 |
| 3,247,456 | 4/1966 | Dokter et al. | 324—70 |

FOREIGN PATENTS

| | | |
|---|---|---|
| 1,082,646 | 7/1959 | France. |
| 1,197,286 | 6/1959 | France. |

RICHARD C. QUEISSER, Primary Examiner.

E. D. GILHOOLY, Assistant Examiner.

U.S. Cl. X.R.

336—30; 340—271; 330—21, 124, 151, 150